United States Patent [19]

Covert et al.

[11] Patent Number: 5,775,755
[45] Date of Patent: Jul. 7, 1998

[54] TUBE GRIPPER DEVICE

[75] Inventors: Steven R. Covert, Waynesboro; Jeffrey P. Moore, Staunton; John M. Rhoades, Waynesboro, all of Va.

[73] Assignee: Duratech, Inc., Waynesboro, Va.

[21] Appl. No.: 820,089

[22] Filed: Mar. 19, 1997

[51] Int. Cl.⁶ .................................................. B25J 15/08
[52] U.S. Cl. ............................. 294/88; 294/100; 901/36
[58] Field of Search .............................. 294/88, 94, 100, 294/116, 86.27, 86.3, 86.31; 901/36, 38, 31

[56] References Cited

U.S. PATENT DOCUMENTS

| | | | |
|---|---|---|---|
| 3,576,342 | 4/1971 | Page | 294/100 |
| 3,827,437 | 8/1974 | Inaba | 294/100 |
| 4,257,639 | 3/1981 | Stock | 294/88 |
| 4,555,216 | 11/1985 | Buschor | 294/116 |
| 4,705,311 | 11/1987 | Ragard | 294/2 |
| 5,407,243 | 4/1995 | Riemann | 294/100 |

*Primary Examiner*—Dean Kramer
*Attorney, Agent, or Firm*—Sughrue, Mion, Zinn, Macpeak & Seas, PLLC

[57] ABSTRACT

A tube gripper device includes a one-piece gripper assembly of plastic material having a base portion and a plurality of gripper fingers extending therefrom in spaced apart parallel relation to each other for individual flexing movement relative to the base. A cam member is slidably engageable with each of said fingers and is connected to a solenoid actuator whereby upon energization of the solenoid actuator, the cam member is moveable to spread the fingers apart. A spring is provided for moving the fingers into gripping engagement with a tube upon de-energization of the solenoid actuator.

3 Claims, 1 Drawing Sheet

TUBE GRIPPER DEVICE

BACKGROUND OF THE INVENTION

The present invention is directed to a tube gripper device and more specifically to a solenoid operated tube gripper device having a plurality of gripper fingers resiliently biased into gripping relation with a tube and solenoid operated cam means for spreading the fingers out of engagement with the tube upon energization of the solenoid.

The use of robotic devices for gripping and transferring articles in a pick and place operation is old and well known in the art. However, such robotic devices are generally very complicated in their construction and operation as well as expensive in manufacture. The gripping fingers of a robotic device are usually pivotally mounted on a main support member for actuation through a mechanical coupling by a servomotor or the like.

The U.S. patent to Borcea et al. (U.S. Pat. No. 4,667,998) discloses an electromagnetic gripper assembly wherein energization of the coil is required to bring the fingers into gripping position. The fingers are connected by a pin and slot arrangement to the armature. The machining and assembly costs of such an arrangement are fairly substantial.

The U.S. patent to Ragard (U.S. Pat. No. 4,705,311) discloses a pick and place spindle assembly utilizing linear and rotary electric motors. A plurality of fingers are pivotally mounted on a support bracket and are normally drawn to each other by a circumferential coil spring. Upon actuation of an electric motor, a central cam member may be extended and retracted for controlling the spreading and closing of the fingers to engage and release an object.

SUMMARY OF THE INVENTION

The present invention provides a new and improved tube gripper device having a simplified, inexpensive construction utilizing a minimum of separate movable parts to facilitate construction and assembly in an economical manner.

The present invention provides a new and improved tube gripper device having a simple, reliable mode of operation requiring only a brief energization of a solenoid during a gripping or releasing operation.

The present invention provides a new and improved tube gripping device comprising a one-piece gripper assembly of plastic material having a base portion and a plurality of gripper fingers extending therefrom in spaced apart, parallel relation to each other for individual flexing movement relative to the base. Actuator means connected to said base and cam means disposed between said fingers and connected to said actuator means for engaging and spreading said fingers apart upon operation of said actuator means and resilient means engaging said fingers for returning said fingers to a parallel tube gripping position upon the de-actuation of said actuator means.

The above and other objects, features and advantages of the present invention will be more apparent and more readily appreciated from the following detailed description of preferred exemplary embodiment of the present invention, taken in connection with the accompanying drawings.

DETAILED DESCRIPTION OF THE INVENTION

The present invention is directed to a tube gripper which is designed to be connected to a robot which is movable along three coordinates X, Y and Z. The robot is designed for moving test tubes from one rack to another or from a rack to an analyzer for testing the contents of the test tube. Thus the tube gripper is disposed in the vertical direction, that is, along the "Z" axis for vertical movement into and out of engagement with the test tubes mounted in a rack beneath the robot.

Figure 2:
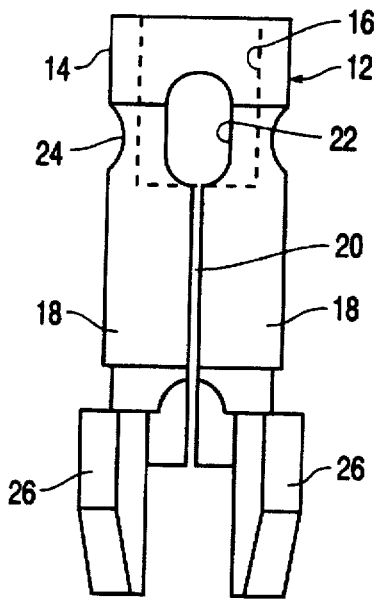
FIG. 2 is a side elevation view of a one-piece gripper device.
Figure 3:
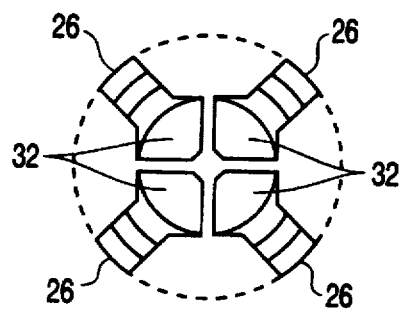
FIG. 3 is an end view of the gripper device in FIG. 2 showing the orientation of the fingers relative to each other.

The gripper assembly is comprised of a support member 10 adapted to be mounted in a suitable robot for movement along the three coordinates. A gripper member 12 is connected to the lower end of the support body 10 by any suitable means such as screw threads or the like. The gripper member 12 is of one-piece molded plastic material which is shown by itself in FIG. 2. The gripper member 12 is comprised of a base portion 14 having a cylindrical recess 16 at one end thereof and a plurality of integral fingers 18 extending in the axial direction thereof in parallel, spaced apart relation. A plurality of gaps 20 (only one of which is shown) are provided between adjacent fingers 18 which widen into substantially oval apertures 22 adjacent the base portion 14. A circumferential groove 24 extends about the four fingers 18 adjacent the base 14. The groove 24 and the apertures 22 reduce the thickness of the fingers 18 adjacent the base member 14 to enhance the flexibility of the fingers 18 which are of integral one-piece molded construction with the base member 14. Each finger 18 is provided with a gripping portion 26 at the end thereof remote from the base member 14. Each gripping member 26 is provided with a soft, resilient cushioning pad 28 of any suitable material to facilitate gripping a test tube 30 during a transfer operation of the test tube along the X, Y, Z coordinates.

The interior surface of each finger 18 is bevelled at 32 to effectively provide a conical surface having the wider base end thereof disposed outwardly into the gripper members 26 with the narrow end of the conical surface extending inwardly toward the base member 14. A hemispherical cam member 34 is disposed in engagement with the bevelled surfaces 32 of the fingers 18 and a stem member 36 connected to the cam member 34 extends inwardly between the fingers 18 toward the base member 14. The stem 36 is secured by any suitable means such as adhesive or screw threads to an armature 38 of the solenoid 10. The solenoid 10 is provided with an electric coil 40 which is shown schematically in FIG. 1 adjacent the armature 38 which is made of a metallic material. Upon energization of the electric coil 40, a magnetic field is generated which attracts the armature 38 upwardly into the coil 40. The upward movement of the armature 38 as viewed in FIG. 1, moves the hemispherical cam member upwardly to slide along the bevelled surfaces 32 of the fingers 18 to spread the fingers 18 apart. A coil spring 42 is disposed in a circumferential groove 44 extending about the fingers 18 at the base of the gripping portions 26. Upon de-energization of the coil 40, the spring 42 will bias the fingers 18 toward each other forcing the hemispherical cam member 34 and the armature 38 downwardly to the position shown in FIG. 1.

Figure 4:
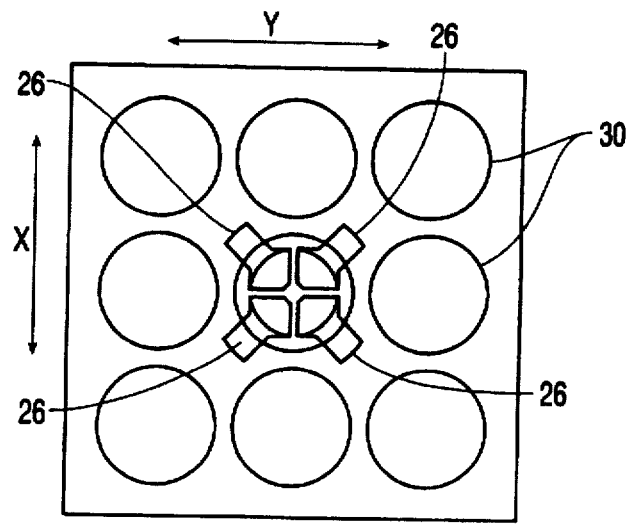
FIG. 4 shows the orientation of the gripper assembly relative to one of a plurality of test tubes mounted in a rack.

A plurality of test tubes 30 have been shown schematically in FIG. 4 in a rectilinear layout as they would appear in a test tube holding rack. The test tube gripping members 26 are oriented diagonally with respect to the layout of the test tubes 30 so that the fingers will be located in the wider gaps between the test tubes whereby the adjacent test tubes will not interfere with the movement of the gripping members 26 into and out of engagement with a specific test tube for removing or inserting the test tube into the rack.

Figure 1:
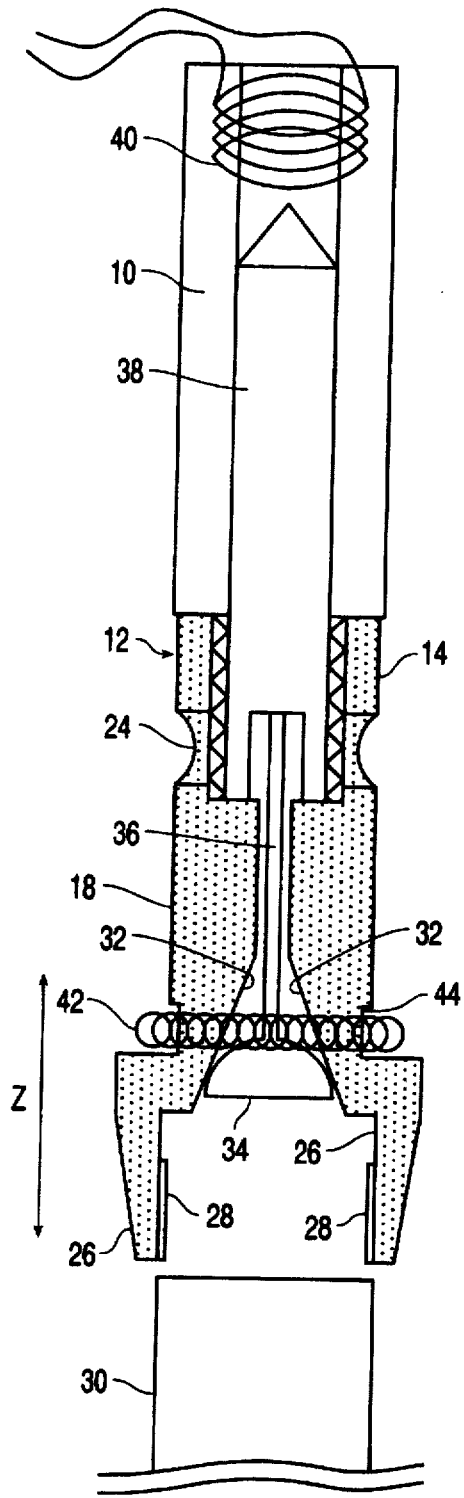
FIG. 1 is a side elevation view of a gripper assembly, partly in section.

As best seen in FIG. 1, it is necessary to energize the solenoid 10 to spread the gripping members 26 of the fingers 18 in order to provide clearance to lower the gripping members 26 in the Z direction into position on opposite sides of the test tube. Upon de-energization of the solenoid, the gripping members 26 will be biased by the spring 42 into gripping engagement with the upper end of the test tube. The test tube 30 may then be lifted from the test tube rack and transferred to any desired position for further testing or handling. When it is desired to insert a test tube into a test tube rack, the test tube is lowered into position and when firmly seated in the rack, the solenoid 10 will be energized to spread the gripper members 26 to allow the gripper assembly to be retracted upwardly along the Z axis. Since the solenoid is not energized when the test tube is being gripped by the gripping members 26, there is no danger of the test tube being accidentally released during a transfer operation due to a power failure. It is only necessary to momentarily energize the coil 40 to engage or disengage the gripper members 26 with the test tube 30.

The material for the gripper assembly 12 may be of any suitable plastic material which has sufficient inherent resiliency to allow the fingers 18 to flex inwardly and outwardly relative to the axis of the assembly. The fingers may be molded separately from each other during the molding operation or a subsequent machining operation could provide the spacings 20 between the fingers 18. Although the gripper device has been described for use with test tubes, it is obvious that the gripper device could be used to transfer any number of objects having a similar configuration.

While the invention has been particularly shown and described with reference to preferred embodiments thereof, it will be understood by those in the art that the foregoing and other changes in form and details may be made therein without departing from the spirit and scope of the invention.

What is claimed is:

1. A tube gripper device comprising a one-piece gripper assembly of plastic material having a base portion, a plurality of gripper fingers extending therefrom in spaced apart parallel relation to each other for individual flexing movement relative to the base portion, solenoid actuator means connected to said base portion and cam means disposed between said fingers and connected to said actuator means for engaging and spreading said fingers apart upon energization of said solenoid actuator means and resilient means disposed in direct continuous engagement with said fingers for returning said fingers to a tube gripping position upon de-energization of said solenoid actuator means.

2. A tube gripper device as set forth in claim 1, wherein each gripper finger is provided with a gripper member having a pad thereon for engaging a tube.

3. A tube gripper device as set forth in claim 1, wherein each gripper finger is provided with a bevelled surface whereby the bevelled surfaces on all of said fingers define a substantially conical surface having a narrow end extending towards said actuator means and wherein said cam means is comprised of a hemispherical cam member disposed in slidable engagement with said bevelled surfaces.

* * * * *